United States Patent
Kennedy et al.

(10) Patent No.: US 9,194,492 B2
(45) Date of Patent: Nov. 24, 2015

(54) PISTON RING HAVING A THERMALLY SPRAYED COATING AND METHOD FOR PRODUCING SAME

(75) Inventors: Marcus Kennedy, Dusseldorf (DE); Michael Zinnabold, Burscheid (DE); Marc-Manuel Matz, Friedberg (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 563 days.

(21) Appl. No.: 13/811,582

(22) PCT Filed: Jun. 20, 2011

(86) PCT No.: PCT/EP2011/060243
§ 371 (c)(1), (2), (4) Date: Apr. 3, 2013

(87) PCT Pub. No.: WO2012/010376
PCT Pub. Date: Jan. 26, 2012

(65) Prior Publication Data
US 2013/0181409 A1    Jul. 18, 2013

(30) Foreign Application Priority Data

Jul. 22, 2010  (DE) .......................... 10 2010 038 289

(51) Int. Cl.
| | |
|---|---|
| B22F 1/00 | (2006.01) |
| F16J 9/26 | (2006.01) |
| B22F 3/115 | (2006.01) |
| B22F 5/10 | (2006.01) |
| C22C 33/02 | (2006.01) |
| C23C 4/06 | (2006.01) |
| C22C 30/02 | (2006.01) |
| C09D 1/00 | (2006.01) |

(52) U.S. Cl.
CPC ................ *F16J 9/26* (2013.01); *B22F 1/0059* (2013.01); *B22F 3/115* (2013.01); *B22F 5/106* (2013.01); *C09D 1/00* (2013.01); *C22C 30/02* (2013.01); *C22C 33/0285* (2013.01); *C23C 4/065* (2013.01); *B22F 2998/00* (2013.01)

(58) Field of Classification Search
CPC ...................................................... B22F 1/0059
See application file for complete search history.

(56) References Cited

U.S. PATENT DOCUMENTS

| 3,617,349 A | 11/1971 | Prasse | |
|---|---|---|---|
| 4,609,401 A * | 9/1986 | Simm | C23C 4/06 75/252 |
| 4,692,305 A * | 9/1987 | Rangaswamy | C23C 4/065 148/403 |

FOREIGN PATENT DOCUMENTS

| WO | WO 02/24970 A2 | 3/2002 |
|---|---|---|
| WO | WO 03/104511 A2 | 12/2003 |
| WO | WO 2008/017848 A1 | 2/2008 |

* cited by examiner

*Primary Examiner* — George Wyszomierski
*Assistant Examiner* — Ngoclan T Mai
(74) *Attorney, Agent, or Firm* — Robert L. Stearns; Dickinson Wright, PLLC

(57) ABSTRACT

A method for producing a piston ring for an internal combustion engine includes providing, a substrate and applying a coating by means of thermal spraying of a powder including solid lubricants on the substrate, having the elemental proportions of 15-30% by weight of iron, Fe; 15-30% by weight tungsten, W; 25-35% by weight of chromium, Cr; 10-35% by weight of nickel, Ni; 1-5% by weight of molybdenum, Mo; 0.2-3% by weight of aluminum, Al; 3-20% by weight of copper, Cu; 1-10% by weight of carbon, C; 0.1-2% by weight of sulfur, S; and 0.1-2% by weight of silicon, Si. The resultant piston ring and coating are also provided.

15 Claims, 2 Drawing Sheets

PISTON RING HAVING A THERMALLY SPRAYED COATING AND METHOD FOR PRODUCING SAME

BACKGROUND OF THE INVENTION

1. Technical Field

The present invention relates to a piston ring with a thermally sprayed coating and in particular including solid lubricants, as well as a corresponding method for the production thereof.

2. Related Art

SUMMARY OF THE INVENTION

The use of thermally sprayed layers as a wear protection layer for sliding elements is common in many industrial sectors. In applications for engines, thermally sprayed layers, amongst other things, are preferably used in the first and second groove on piston rings. Development is increasingly focused on iron-based materials to meet the requirements in the engine operation with regard to physical properties and costs.

The mating components for piston rings are often also based on iron. This increases the risk of scorch mark formation right up to seizing up, since adhesive wear can occur due to metals of the same kind under certain boundary conditions (inadequate lubrication and high temperatures).

Accordingly, a layer system needs to be developed, which reduces the possible seizing-up tendency of iron-based sprayed layers, and also has sufficient toughness to avoid material fatigue with constantly high thermal loads.

Iron-based coatings, deposited by means of thermal spraying, have still not found use on the piston ring; in the area of the crank drive, only iron-based coatings on the cylinder wall have been known hitherto, produced by means of wire arc spraying (LDS).

The production of wear protection layers by means of the thermal spraying method is a fundamentally known method. The powder materials used nowadays for this purpose are based on molybdenum, tungsten carbide, nickel chromium and $Cr_3C_2$. High carbide proportions, however, lead to impairment of the fatigue strength and of the fracture toughness. On account of the high market prices for molybdenum, alternatives are required in the medium term.

In order to solve the problem described above, the coating should have the following features:
1) similar physical properties to the substrate to be coated;
2) sufficient wear resistance for the system "thermally sprayed piston ring with iron-based cylinder wall, lubricated";
3) sufficient resistance to scorch marks and seizing up;
4) sufficient fracture toughness and as a result improved fatigue behaviour.

According to a first aspect of the invention, therefore, a method is made available for the production of a piston ring for an internal combustion engine, comprising
provision of a substrate; and
application of a coating by thermal spraying of a powder including solid lubricants, comprising the element proportions
15-30% by weight of iron, Fe;
15-30% by weight of tungsten, W;
25-35% by weight of chromium, Cr;
10-35% by weight of nickel, Ni;
1-5% by weight of molybdenum, Mo;
0.2-3% by weight of aluminium, Al;
3-20% by weight of copper, Cu;
1-10% by weight of carbon, C;
0.1-2% by weight of sulphur, S; and
0.1-2% by weight of silicon, Si.

With regard to the physical properties (thermal conductivity, thermal expansion coefficient), a quasi-homogeneous system between substrate and coating arises due to a minimum proportion of the iron-containing basic system of 15% by weight. The thermal energy arising during the mixed friction, in particular in the region of the upper and lower centre point (OT/UT), can be carried away better and a uniform thermal relaxation process can be guaranteed by the temperature fluctuations present in the engine.

Basically, the overall system comprises the following elements: iron (Fe), tungsten (W, as WC or $WS_2$), chromium, (Cr, as Cr and $Cr_3C_2$), nickel (Ni), molybdenum (as Mo or $MoS_2$), silicon (Si) and carbon (C, partially bound in Fe, W and Cr as carbide). The use of Fe-based alloys as a piston-ring base coating material together with a carbide system leads to the production of a new type of piston ring.

According to an embodiment, the powder contains a proportion of 20-50% by weight of carbides with the following concentrations:
10-30% by weight of tungsten carbide, WC; and
5-20% by weight of $Cr_3C_2$.

According to an embodiment, the powder contains solid lubricants, which comprise AlCuFe, $MoS_2$, $WS_2$ or mixtures thereof. The proportion of solid lubricants in the powder preferably amounts to 5-20% by weight, split up into the following fractions:
0-20% by weight of AlCuFe;
0-5% by weight of $MoS_2$; and
0-5% by weight of $WS_2$.

The iron-based alloy without carbides or with higher solid lubricant proportions is not to be recommended, since the wear resistance becomes too low.

According to an embodiment, the solid lubricants contain AlCuFe with the following concentrations:
80-95% by weight of Cu;
5-20% by weight of Al;
1-5% by weight of Fe; and
0.1-3% by weight of oxygen, O.

According to an embodiment, the $WS_2$ proportion amounts to 1.5-3.5% by weight and the $WS_2$ is embedded in a nickel matrix.

According to an embodiment, the $MoS_2$ proportion amounts to 1-2.5% by weight and the $MoS_2$ is embedded in a nickel matrix.

According to an embodiment, the particle sizes of the powder lie in the range 1-100 μm.

According to an embodiment, the particle sizes of the solid lubricants lie in the range 1-150 μm.

According to an embodiment, the carbides are embedded in an NiCr matrix and have a particle size of 0.5-5 μm.

According to an embodiment, the layer thickness of the coating lies in the range from 20-1000 μm.

According to an embodiment, the thermal spraying method comprises high-velocity flame spraying or plasma spraying.

According to an embodiment, the hardness of a coating produced according to the invention lies in the range from 500-1000 HV0.1 μm.

According to an embodiment, the fracture toughness of a coating produced according to the invention lies in the range from 2.5-7.5 $(MPa\,m)^{1/2}$.

According to an embodiment, the piston ring is a cast iron or steel piston ring.

According to a second aspect of the invention, a piston ring is provided, produced with a method as described above.

DETAILED DESCRIPTION OF THE INVENTION

Figure 1:
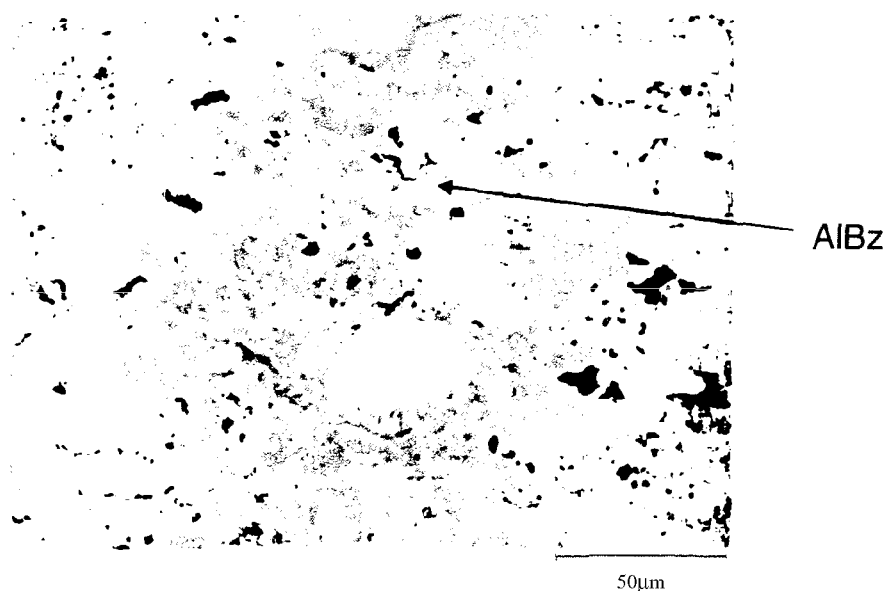
FIG. 1 shows a microstructural image (500:1) of a thermally sprayed layer according to a first embodiment.
Figure 2:
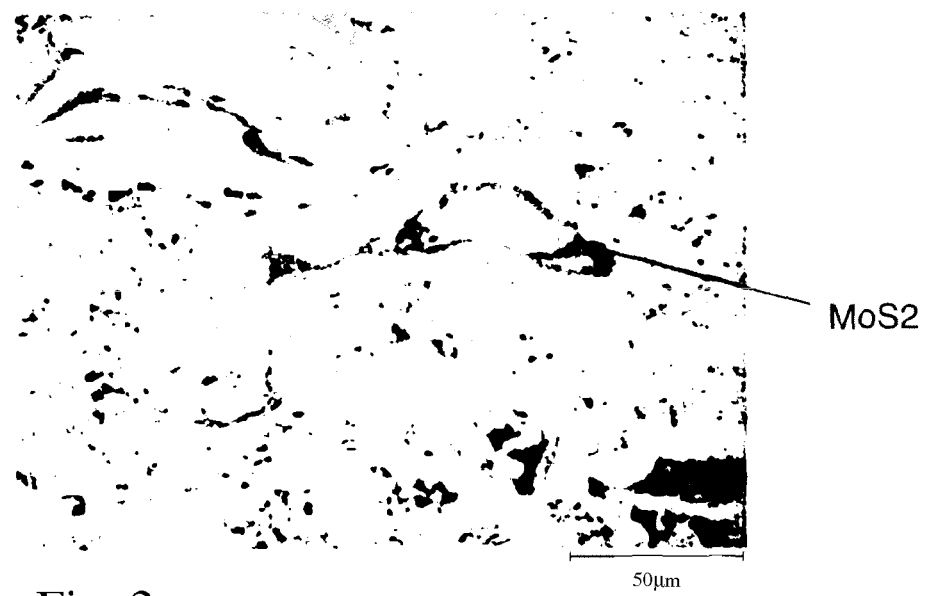
FIG. 2 shows a microstructural image (500:1) of a thermally sprayed layer according to a second embodiment.
Figure 3:
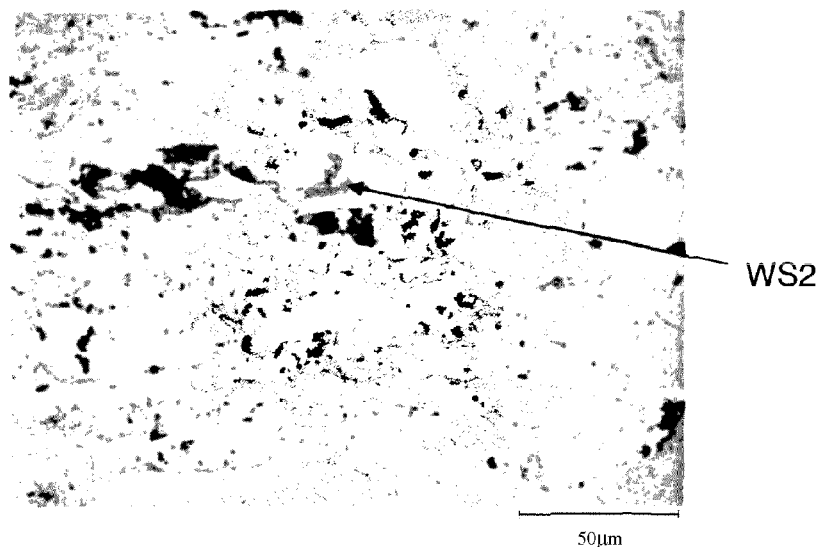
FIG. 3 shows a microstructural image (500:1) of a thermally sprayed layer according to a third embodiment.
Figure 4:
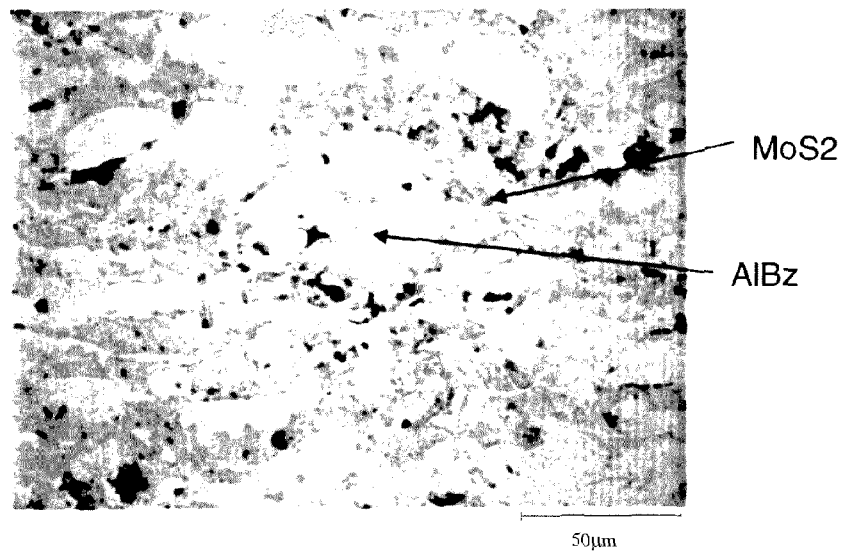
FIG. 4 shows a microstructural image (500:1) of a thermally sprayed layer according to a fourth embodiment.

Tests Carried Out:

The powder was thermally sprayed by means of high-velocity flame spraying (high velocity oxy fuel, HVOF) and the chemical composition (table 1), microstructure (FIG. 1-4), porosity and hardness (table 2) were measured for various variants. The total carbide proportion stood at approx. 40% by weight in the case of all the powders used.

Table 1 shows the chemical composition and the proportion of solid lubricants of the layer systems used in the test.

TABLE 1

Chemical composition of the various layer systems

| Test # | Solid lubricant | Proportion of solid lubricant (wt. %) | Fe | W | Cr | Ni | Mo | Al | Cu | S | C | Si |
|---|---|---|---|---|---|---|---|---|---|---|---|---|
| | | | | | | | (wt. %) | | | | | |
| 1 | — | — | 24 | 23 | 33 | 12 | 2.6 | — | — | — | 4.9 | 0.5 |
| 2 | AlCuFe | 10 | 22 | 20 | 30 | 11 | 2.3 | 1 | 9 | — | 4.4 | 0.5 |
| 3 | Ni—MoS2 | 10 | 22 | 20 | 30 | 21 | 3.0 | — | — | 0.5 | 3.1 | 0.8 |
| 4 | Ni—WS2 | 10 | 22 | 22 | 30 | 19 | 2.3 | — | — | 0.5 | 4.9 | 0.5 |
| 5 | AlCuFe + Ni—MoS2 | 5 in each case | 22 | 20 | 30 | 15 | 2.7 | 0.5 | 4.5 | 0.2 | 4.9 | 0.5 |

The averaged values in respect of porosity and mechanical properties are represented in table 2.

TABLE 2

Layer properties after the HVOF spraying

| Test # | Carbide proportion nominal (wt. %) | Solid lubricant | Proportion solid lubricant (wt. %) | Hardness HV0.1 | Fracture toughness $K_{1c}$ MPa $m^{1/2}$ | Porosity % |
|---|---|---|---|---|---|---|
| 1 | 40 | — | 0 | 695 | 2.3 | <1 |
| 2 | 40 | AlCuFe | 10 | 705 | 5.9 | <2 |
| 3 | 40 | Ni—MoS2 | 10 | 715 | 2.6 | <2 |
| 4 | 40 | Ni—WS2 | 10 | 670 | 2.9 | <2 |
| 5 | 40 | AlCuFe + Ni—MoS2 | 5 in each case | 643 | 3.5 | <2 |

The microstructural images (FIG. 1-4) of a layer produced according to test #1 to #4 display homogeneously distributed carbides, no unmelted particles and a very dense layer with a very low porosity of <2%.

The following facts become clear from table 2:
1. The porosity of the iron-based layer provided with solid lubricants changes only very slightly.
2. The hardness likewise does not change markedly due to the addition of solid lubricants.
3. The addition of solid lubricants improves the fracture toughness, the addition of 10% by weight of AlCuFe producing the greatest increase in the fracture toughness, and therefore the best resistance to material fatigue.

An increase in the lubricant concentration for $WS_2$ and $MoS_2$ of in each case >5% by weight and an increase in the AlCuFe concentration of >20% by weight is not to be recommended, since it is expected here that the wear resistance will thus become less.

It becomes clear from the test results that a new type of piston ring has been produced by means of this new layer system. The separation efficiency (DE value) of all the layer systems of this invention lies at approx. 50%.

In addition to the aforementioned advantages of a piston ring produced with the method according to the invention, there is also the fact that the new powder is approx. 30% more favourable than the Mo-based powder made available at present.

The invention claimed is:

1. A spray powder for thermal spraying, wherein the powder, including a proportion of 5-20% by weight of solid lubricant, comprises the element proportions:

15-30% by weight of iron, Fe;
15-30% by weight of tungsten, W;
25-35% by weight of chromium, Cr;
10-35% by weight of nickel, Ni;
1-5% by weight of molybdenum, Mo;
0.2-3% by weight of aluminium, Al;
3-20% by weight of copper, Cu;
1-10% by weight of carbon, C;
0.1-2% by weight of sulphur, S; and
0.1-2% by weight of silicon, Si.

2. The spray powder according to claim 1, wherein the powder contains a proportion of 20-50% by weight of carbides with the following concentrations:

10-30% by weight of tungsten carbide, WC; and
5-20% by weight of $Cr_3C_2$.

3. The spray powder according to claim 2, wherein the carbides are embedded in NiCr matrix and have a particle size of 0.5-5 μm.

4. The spray powder according to claim 1, wherein the powder contains solid lubricants, which comprise AlCuFe, $MoS_2$, $WS_2$ or mixtures thereof, wherein the proportion of solid lubricants of 5-20% by weight is split up into the following fractions:

0-20% by weight of AlCuFe;
0-5% by weight of $MoS_2$; and
0-5% by weight of $WS_2$.

5. The spray powder according to claim 4, wherein the solid lubricants contain AlCuFe with the following concentrations:

80-95% by weight of Cu;
5-20% by weight of Al;
1-5% by weight of Fe; and
0.1-3% by weight of oxygen, O.

6. The spray powder according to claim 4, wherein the $WS_2$ proportion amounts to 1.5-3.5% by weight and the $WS_2$ is embedded in a nickel matrix.

7. The spray powder according to claim 4, wherein the $MoS_2$ proportion amounts to 1-2.5% by weight and the $MoS_2$ is embedded in a nickel matrix.

8. The spray powder according to claim 4, wherein the particle sizes of the solid lubricants lie in the range 1-150 μm.

9. The spray powder according to claim 1, wherein the particle sizes of the powder lie in the range 1-100 μm.

10. A piston ring, comprising a substrate and a coating, which is deposited by thermal spraying of a powder, wherein the powder, including a proportion of 5-20% by weight of solid lubricants, comprises the element proportions:
15-30% by weight of iron, Fe;
15-30% by weight of tungsten, W;
25-35% by weight of chromium, Cr;
10-35% by weight of nickel, Ni;
1-5% by weight of molybdenum, Mo;
0.2-3% by weight of aluminium, Al;
3-20% by weight of copper, Cu;
1-10% by weight of carbon, C;
0.1-2% by weight of sulphur, S; and
0.1-2% by weight of silicon.

11. The piston ring according to claim 10, wherein the layer thickness of the coating lies in the range from 20-1000 am.

12. The piston ring according to claim 10, wherein the thermal spraying method comprises high-velocity flame spraying or plasma spraying.

13. The piston ring according to claim 10, wherein the hardness of the coating lies in the range from 600-1000 HV0.1 μm.

14. The piston ring according to claim 10, wherein the fracture toughness of the coating lies in the range from 2.6-7.0 $(MPa\ m)^{1/2}$.

15. The piston ring according to claim 10, wherein the piston ring is a cast iron or steel piston ring.

* * * * *